Figure 1:
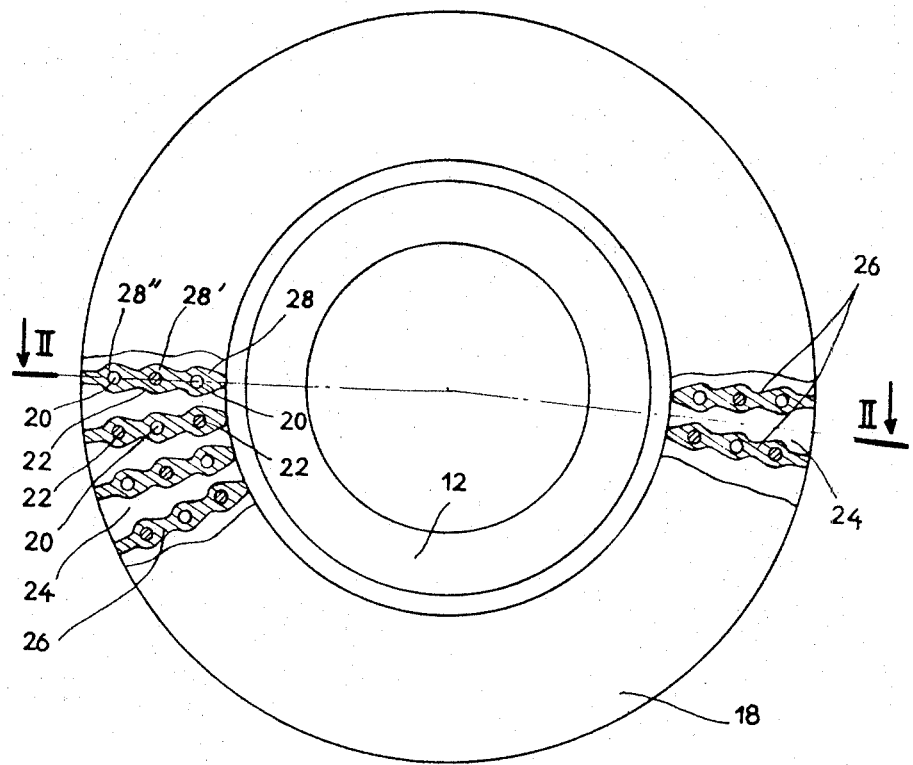

United States Patent [19]
Huet

[11] 3,732,953
[45] May 15, 1973

[54] ROTATABLE FRICTION PLATE ASSEMBLY AND METHOD OF MAKING THEREOF

[75] Inventor: Roger Huet, Grenoble, France

[73] Assignee: Merlin Gerin, Societe Anonyme, Grenoble, France

[22] Filed: Jan. 29, 1971

[21] Appl. No.: 110,881

[30] Foreign Application Priority Data

Feb. 16, 1970 France..................................7005500

[52] U.S. Cl......188/218 XL, 188/71.6, 188/264 AA, 192/107 M, 192/113 A
[51] Int. Cl. .........................F16d 65/12, F16d 65/84
[58] Field of Search....................188/71.6, 73.2, 255, 188/264 A, 264 AA, 218 XL; 192/113 A, 107 M

[56] References Cited
UNITED STATES PATENTS

| | | | |
|---|---|---|---|
| 3,391,763 | 7/1968 | Severson | 188/264 AA |
| 715,111 | 12/1902 | Miller | 192/113 A |
| 2,262,709 | 11/1941 | Lambert | 188/264 A |
| 1,912,716 | 6/1933 | Lane | 192/113 A |
| 2,326,961 | 8/1943 | McCune | 188/73.2 X |
| 3,435,935 | 4/1969 | Warman | 188/218 XL X |

Primary Examiner—Evon C. Blunk
Assistant Examiner—Bruce H. Stoner, Jr.
Attorney—Steven, Davis, Miller & Mosher

[57] ABSTRACT

A rotatable friction plate assembly for a clutch or a brake comprising a cast light alloy base plate sandwiched between two facings of friction material, such as cupro-chromium. A plurality of heat conducting studs project from the backside of either facing in radial arrays to permit casting of the flange portion between the positioned facings whereby the flange portion is shaped to form radial ribs embedding said studs and to define radial vent conduits.

5 Claims, 2 Drawing Figures

PATENTED MAY 15 1973

3,732,953

ROTATABLE FRICTION PLATE ASSEMBLY AND METHOD OF MAKING THEREOF

This invention relates to a rotatable friction plate assembly and to a method of making the same and concerns more particularly disc brakes of motor vehicles.

The ever-increasing performances of competition cars are placing ever more stringent requirements on braking, resulting in severe stressing of brake discs.

Brake discs must of course be good heat conductors, to facilitate dissipation of the heat caused by braking, must have adequate mechanical strength, particularly at the high temperatures at which they operate, and a coefficient of friction such that satisfactory braking is provided when the brake pads are applied. Conventional cast-iron discs have very limited braking abilities, and the use of solid cupro-chromium alloy discs was a considerable advance. Unfortunately, such discs are very heavy and the resulting extra inertia is a particular disadvantage at the high speeds of present-day competition cars.

It is an object of this invention to obviate these disadvantages and to provide a very lightweight friction plate assembly providing very effective braking and having a high mechanical strength and excellent heat conducting characteristics.

In the method according to the invention a unitary friction structure having a planar friction surface and a plurality of backwardly directed studs is first manufactured and a lightweight supporting base plate then cast on the friction structure. The friction structure, which is prefabricated of a material having high mechanical strength and an appropriate coefficient of friction, is thus anchored to a light-alloy flange of the base plate during the casting so as to provide metallurgical homogeneity and obviate any interval. The base plate, which is a light-alloy casting, has satisfactory mechanical characteristics at the high temperatures of approximately from 250° to 350° C at which the device operates. Another advantage is very good heat conduction for dissipating the heat caused by running against the pads.

The unitary friction structure can be composed of a cupro-chromium alloy whereby the cast light alloy of the base plate can be chosen as the material defined by French Standard A-U5NZr or by Rolls Royce Standard RR 350. (Cu 4.5 to 5.5 percent; Ni 1.3 to 1.8 percent; Si $\leq$ 0.3 percent; Fe $\leq$ 0.5 percent; Mn 0.2 to 0.3 percent; Co 0.1 to 0.4 percent; Sb 0.1 to 0.4 percent; Ti 0.15 to 0.25 percent; Zr 0.1 to 0.3 percent; balance Al whereby Co + Sb $\leq$ 0.6 percent and Ti + Zr $\leq$ 0.5 percent).

The manufacturing method according to the invention by moulding ensures good cohesion between the two metals and satisfactory anchorage of the friction facings in the base member, while the metallurgical homogeneity ensures good heat conductivity facilitating heat exchange from the friction facings to the disc frame.

The braking properties of friction assemblies according to the invention are comparable with the braking qualities of solid cupro-chromium discs but with a 30 to 40 percent weight advantage.

Figure 2:
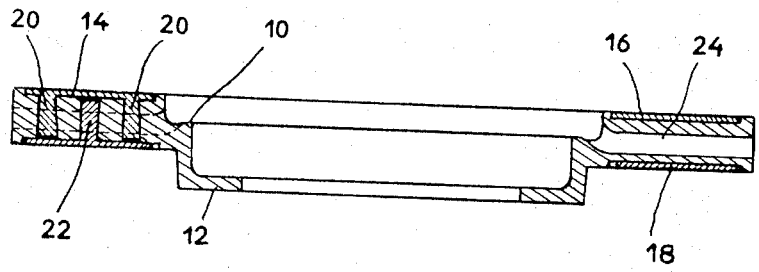

Other objects and advantages of the invention will become evident from the following description of an embodiment of the invention shown in the accompanying drawings wherein:

FIG. 1 is a front view of a friction plate assembly according to the invention, with some of the front friction facing being removed to show the internal construction of the assembly, and FIG. 2 is a section along the line II—II of FIG. 1.

Referring now to the drawings, the friction plate assembly shown comprises a base plate or wheel 10 having a hub part 12 which extends towards the center and which is adapted to be secured to a car wheel (not shown). The assembly 10 has an outer flange portion 14 sandwiched between two annular friction facings 16, 18. Each facing 16, 18 comprises a shallow disc, the outside surface of which contacts friction pads (not shown) in known manner so that braking can be provided by clamping of the assembly; on its inside face each facing 16, 18 has projections or studs, 20 and 22, respectively of undercut shape which are embedded in the mass of the flange 14 during the casting thereof. The facings 16, 18 are composed of a material which is a good heat conductor and which has an appropriate coefficient of friction, for instance, a cupro-chromium alloy. The assembly 10 is a light-alloy moulding of good heat conductivity and having high mechanical strength at operating temperatures, for instance, a material according to French Standard A-U5NZr. The facings 16, 18 are anchored when the assembly 10 is cast by means of a cast process providing good cohesion between different metals so as to produce a monolithic bimetallic disc.

The studs 20 of facing 16 and the studs 22 of facing 18 are integral with the respective facings and form a unitary structure therewith which can be manufactured before casting of the assembly. The studs 20 and 22 are preferably aligned radially to leave between each radial row an interval 24 which can be used to form a venting conduit extending radially between the inside and outside peripheries of the flange 14. This reduces disc weight and in known manner facilitates cooling of the disc by the flow of a cooling fluid through the conduits 24. The studs 20, 22 are therefore embedded in radial ribs 26 of flange portion 14 which form the lateral wall means of the conduits 24. Preferably, in each array the studs are associated alternatively with one and the other facing whereby the studs extend lengthwise across the entire width of the flange portion separating the facings.

In the embodiment shown, there are three studs embedded in each rib 26, and two of them, for instance, 20, are integral with one, 16, of the facings 16, or 18, whereby the remaining intermediate stud 22 is integral with the other facing, 18. The arrangement of the studs is reversed in the adjacent rib so that the intermediate stud thereof is integral with facing 16 and disposed between two studs 22 of the facing 18. The alternative arrangement of the studs 20, 22 improves their anchorage, although other arrangements can be used. Of course, the number of studs per rib 26 may be different from three.

Advantageously, each rib 26 has a reinforced section or boss 28, 28', 28'' at the location of each stud 20 and 22, so that sufficient thickness of cast metal is left to cover the studs and, more particularly, the cross-section of the conduit 24 can be constricted in this zones. In the embodiment shown, each conduit 24 has three consecutive throats in which the flow speed of the cooling fluid increases. Preferably, the conduit 24 takes the form of a sequence of convergent and divergent sections which are smoothly connected to one another to reduce disturbance of the fluid flow. The conduits 24 can readily be designed as venturis when the disc is cast, with a consequent appreciable improvement in heat dissipation by way of the studs 20, 22.

The assembly according to the invention combines the advantages of cupro-chromium of the friction facings, i.e. a satisfactory coefficient of friction, good mechanical strength and good heat conductivity, with the properties of light alloys of the A–U5NZr type, such as low weight, good mechanical strength at high temperatures and good heat conductivity. Mechanical properties and heat conductivity are not affected by the junction between the two metals, thanks to the anchorage by the casting method according to the invention.

What is claimed is :

1. A rotatable plate comprising:
a pair of unitary structures of friction material having each a radially extending planar annular friction facing and a plurality of heat conducting supporting studs on the backside thereof, and
a supporting base plate of cast light alloy having a flange portion,
said structure being spaced apart back-to-back with interdigitating studs in sandwich relation with said flange portion cast thereon, said flange portion covering said backside of the friction facings and embedding said studs to enhance heat dissipation from said friction facings, said flange portion being shaped to define a plurality of radiating inner venting conduits circumferentially alternating with radiating solid sections, said studs being embedded in said solid sections.

2. A rotatable friction plate comprising: a pair of unitary structures of friction material having each a radially and circumferentially extending planar annular friction facing and a plurality of heat conducting supporting studs on the backside thereof, said structures being disposed back-to-back so that the free ends of the studs of each structure bear against the backside of the facing of the other structure and a supporting base plate of light alloy having a flange portion cast on the backsides of said structures and shaped to define a plurality of radiating inner venting conduits circumferentially alternating with radiating solid sections, said studs being entirely embedded in said solid sections to enhance heat dissipation from the friction facings of said structures, the entire surface of said backsides of said facings engaging coextensive outer portions of said flange portion.

3. A friction plate as set forth in claim 2, said studs being disposed in substantial radial arrays corresponding to said radiating solid sections of said base plate, successive studs of each array being associated alternatively with one and the other of said facings.

4. A friction plate as set forth in claim 2, said solid sections having outer wall means shaped to define radially succeeding throat portions of said vending conduits.

5. A friction plate as set forth in claim 2, said studs tapering down from the free ends thereof towards the backside of the facing with which said studs are integrally formed.

* * * * *